US00RE43249E

(19) United States
(12) Reissued Patent
Ewringmann

(10) Patent Number: US RE43,249 E
(45) Date of Reissued Patent: Mar. 20, 2012

(54) ROOF ASSEMBLY FOR ROAD CONSTRUCTION MACHINE

(75) Inventor: Ulrich Ewringmann, Taufkirchen-Potzham (DE)

(73) Assignee: Joseph Vögele AG, Ludwigshafen (DE)

(21) Appl. No.: 29/312,214

(22) Filed: Jul. 8, 2008

Related U.S. Patent Documents

Reissue of:
(64) Patent No.: Des. 554,158
Issued: Oct. 30, 2007
Appl. No.: 29/269,037
Filed: Nov. 16, 2006

(30) Foreign Application Priority Data

May 16, 2006 (EM) ..... 000539432

(51) LOC (9) Cl. ..... 15-03
(52) U.S. Cl. ..... D15/30
(58) Field of Classification Search ..... D15/10, D15/17, 22–26, 28, 30, 33; D34/37; 296/102, 296/215, 224, 225, 187.1, 210, 187.11, 187.12, 296/187.13, 193.12, 190.01, 190.08, 216.02; 135/88.01; 49/501
See application file for complete search history.

(56) References Cited

U.S. PATENT DOCUMENTS

| | | | | | |
|---|---|---|---|---|---|
| D184,043 | S | * | 12/1958 | Dodge | D15/30 |
| D210,658 | S | * | 4/1968 | Lazzeroni | D15/30 |
| 3,561,816 | A | * | 2/1971 | Koch | 296/102 |
| 3,712,664 | A | * | 1/1973 | May | 296/102 |
| D230,297 | S | * | 2/1974 | Purcell et al. | D15/30 |
| D275,199 | S | * | 8/1984 | Schmidt et al. | D15/30 |

(Continued)

*Primary Examiner* — Mark Goodwin

(74) *Attorney, Agent, or Firm* — Fish & Richardson P.C.

(57) CLAIM

The ornamental design for a roof assembly for road construction machine, as shown and described.

DESCRIPTION

FIG. 1 is a perspective view of a roof assembly for road construction machine showing my new design in a closed wing configuration;
FIG. 2 is a left elevation view of the roof assembly for road construction machine of FIG. 1;
FIG. 3 is a front elevation view of the roof assembly for road construction machine of FIG. 1;
FIG. 4 is a right elevation view of the roof assembly for road construction machine of FIG. 1;
FIG. 5 is a top plan view of the roof assembly for road construction machine of FIG. 1;
FIG. 6 is a bottom plan view of the roof assembly for road construction machine of FIG. 1;
FIG. 7 is a rear elevation view of the roof assembly for road construction machine of FIG. 1;
FIG. 8 is a perspective view of a roof assembly for road construction machine showing my new design in an open wing configuration;
FIG. 9 is a left elevation view of the roof assembly for road construction machine of FIG. 8;
FIG. 10 is a front elevation view of the roof assembly for road construction machine of FIG. 8;
FIG. 11 is a right elevation view of the roof assembly for road construction machine of FIG. 8;
FIG. 12 is a top plan view of the roof assembly for road construction machine of FIG. 8;
FIG. 13 is a bottom plan view of the roof assembly for road construction machine of FIG. 8; and,
FIG. 14 is a rear elevation view of the roof assembly for road construction machine of FIG. 8.

1 Claim, 8 Drawing Sheets

Figure 1:
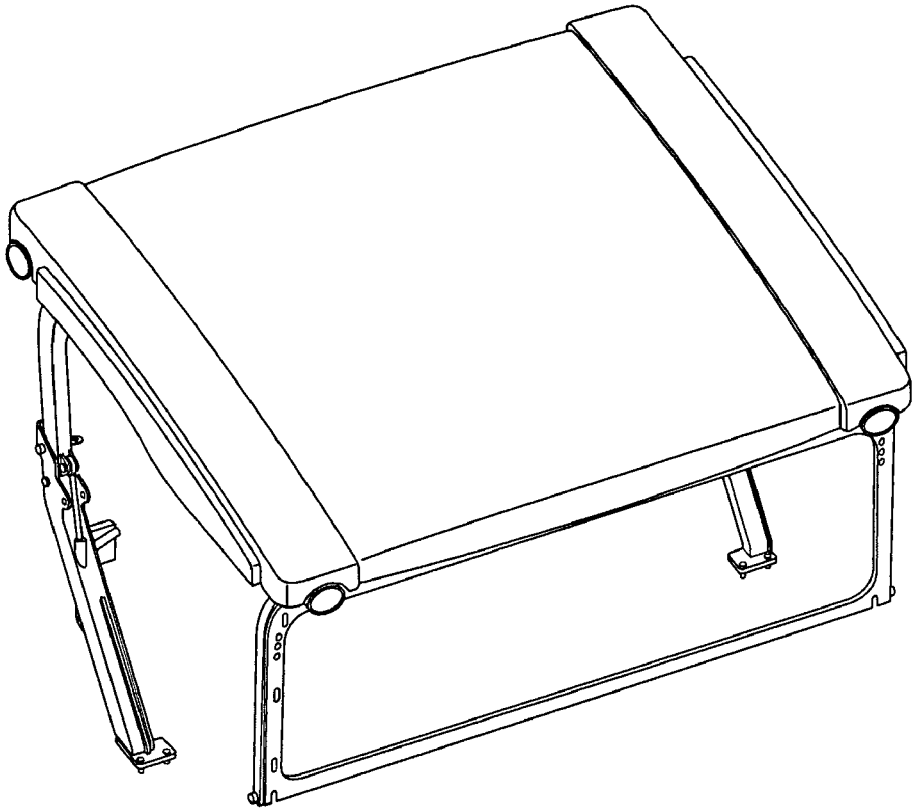
Figure 2:
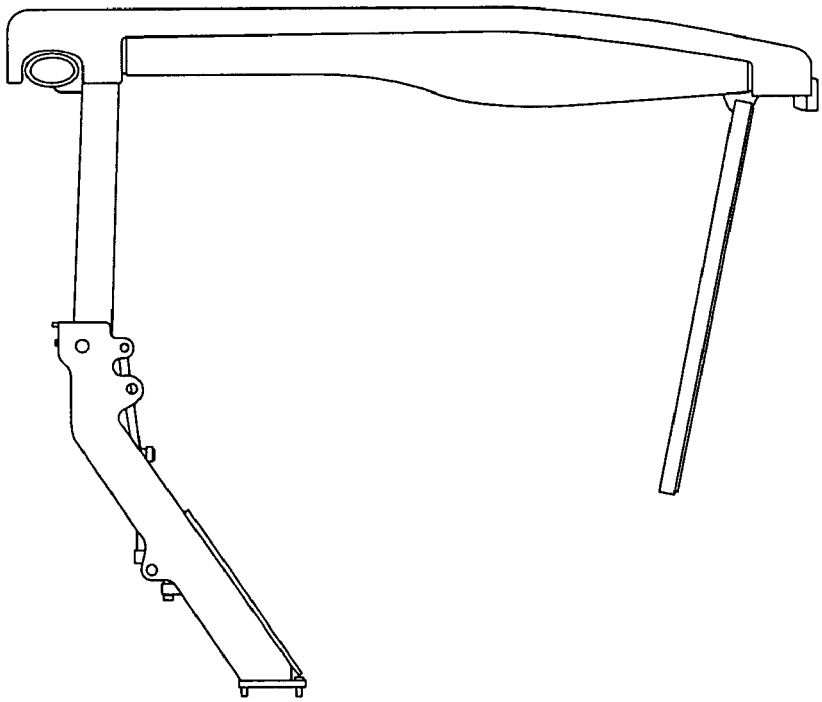
Figure 3:
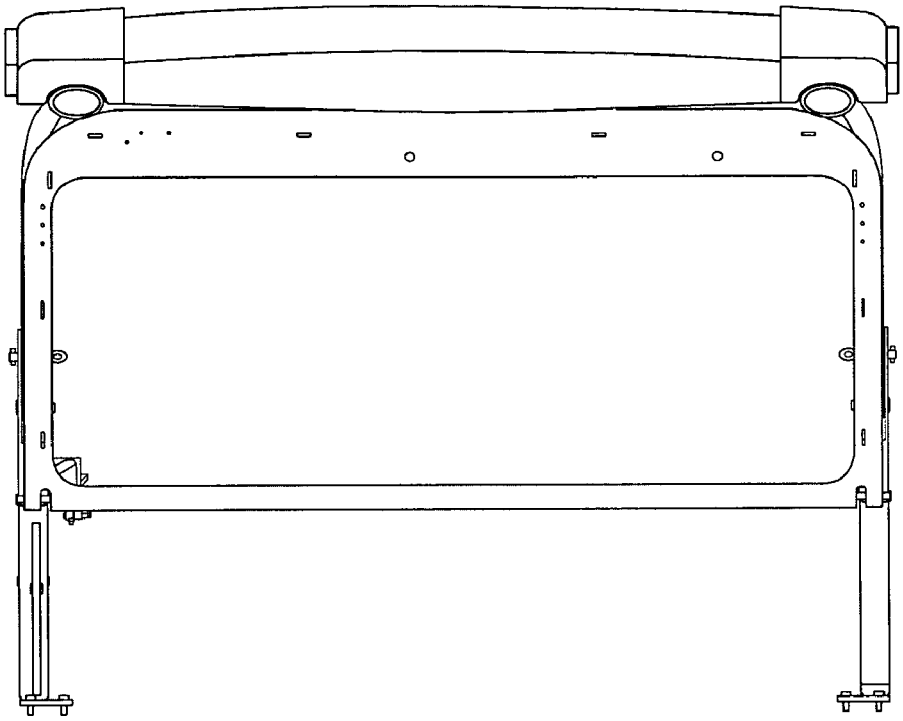
Figure 4:
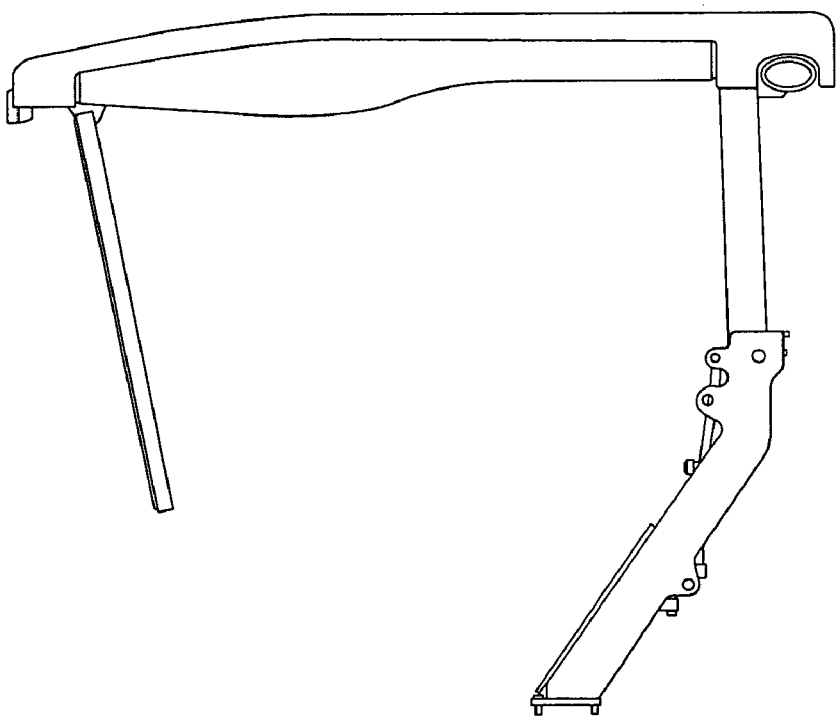
Figure 5:
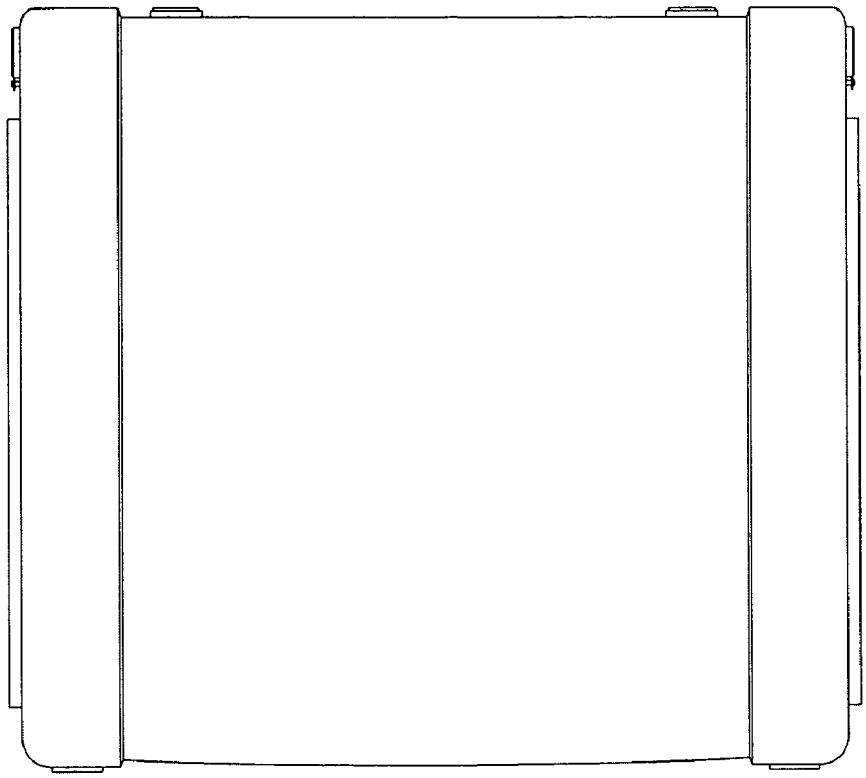
Figure 6:
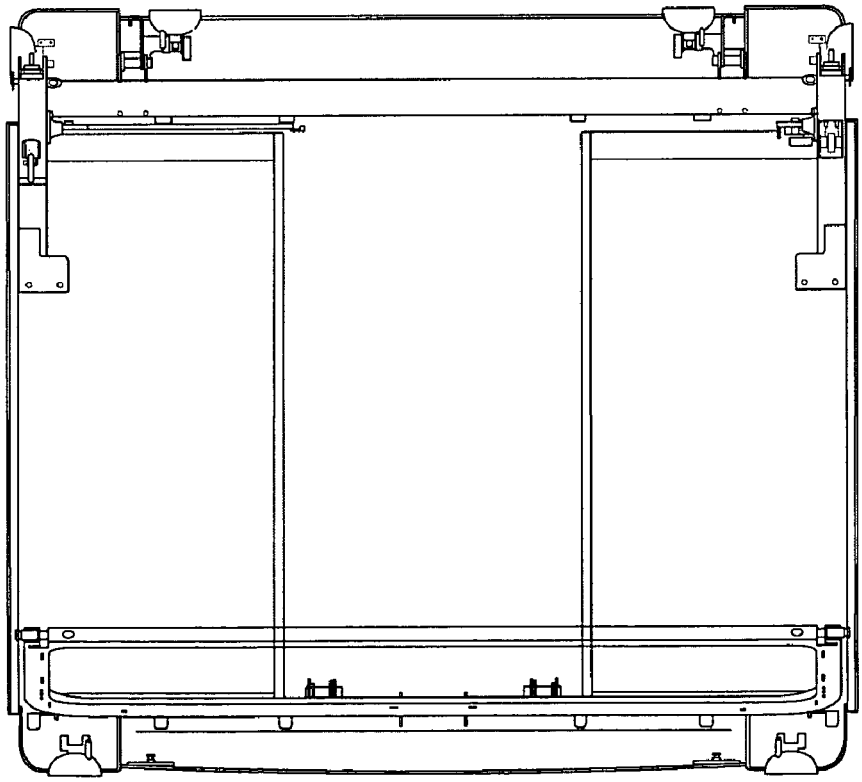
Figure 7:
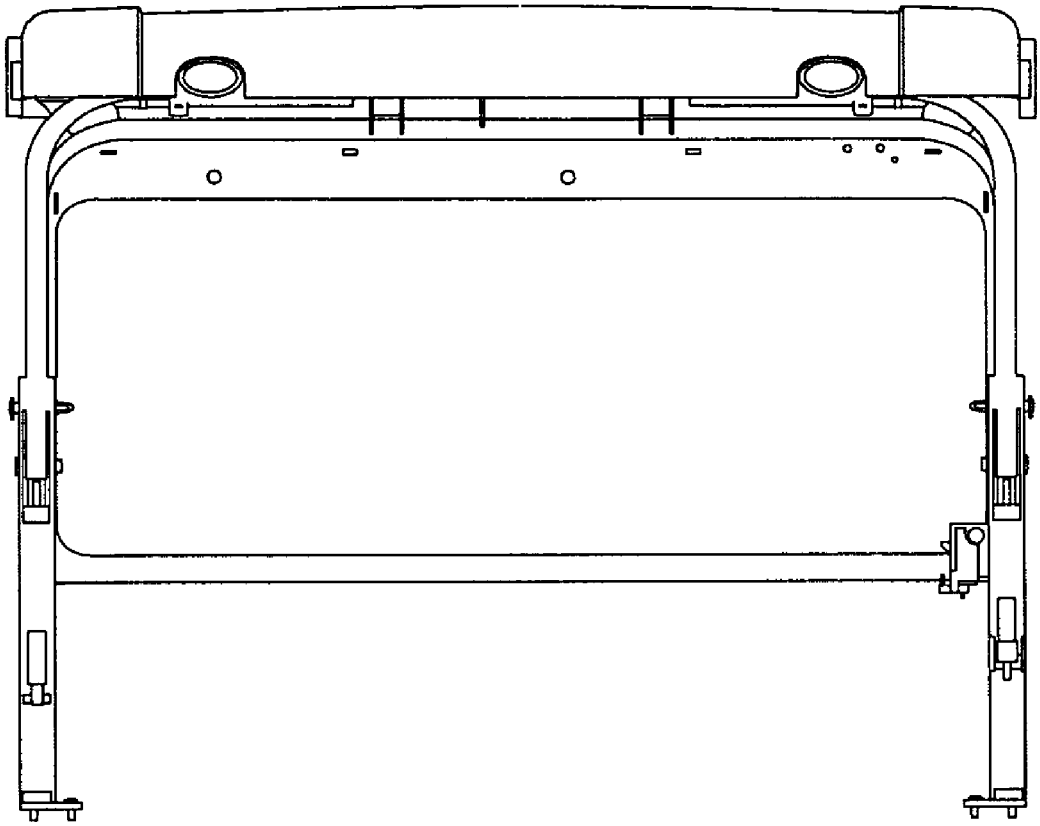
Figure 8:
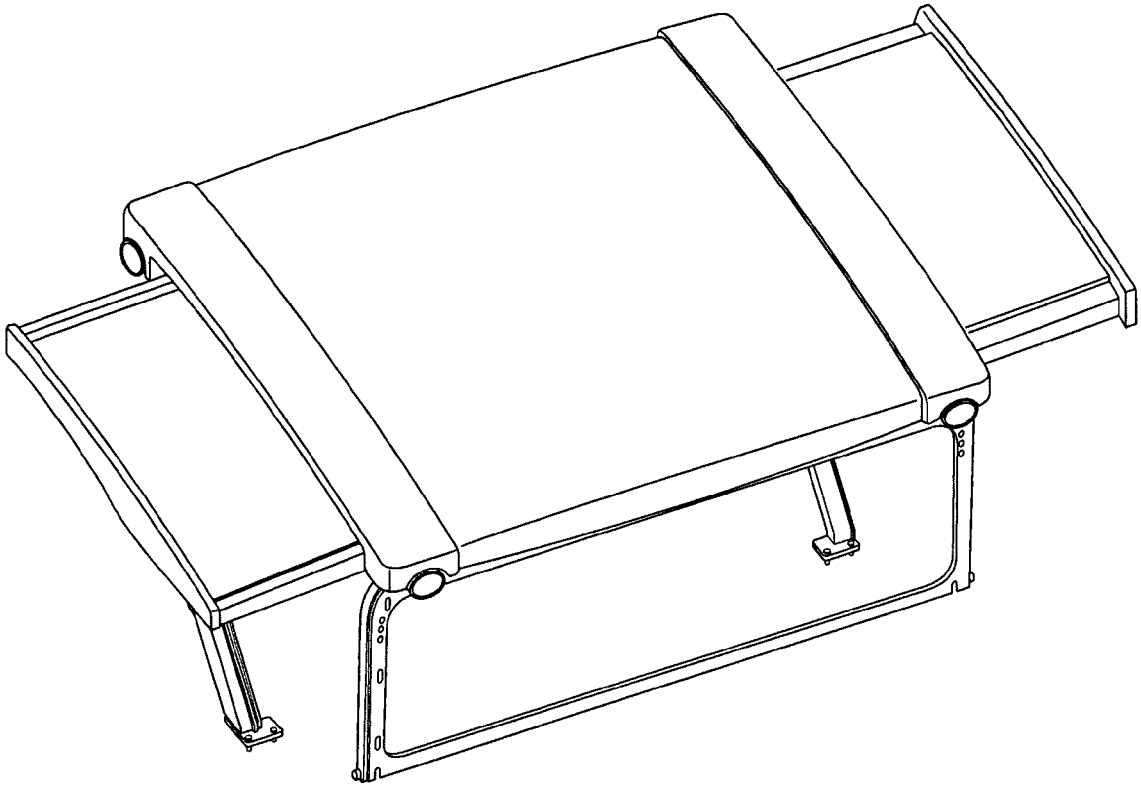
Figure 9:
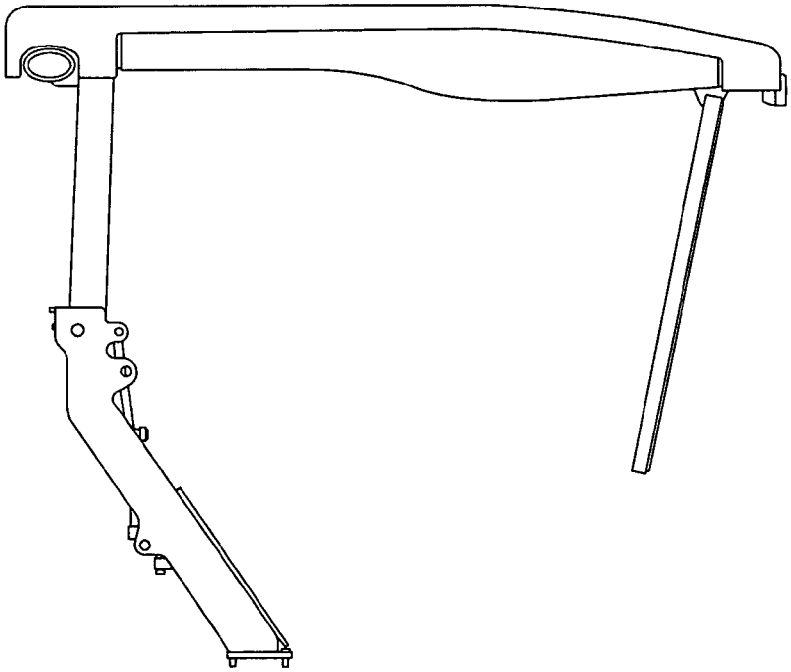
Figure 10:
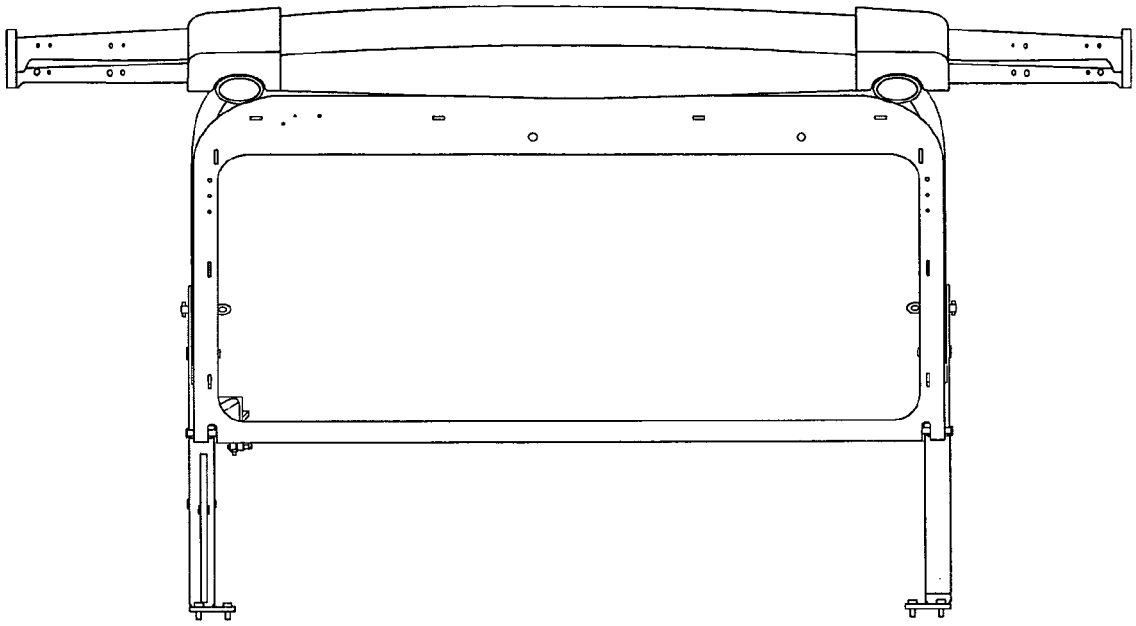
Figure 11:
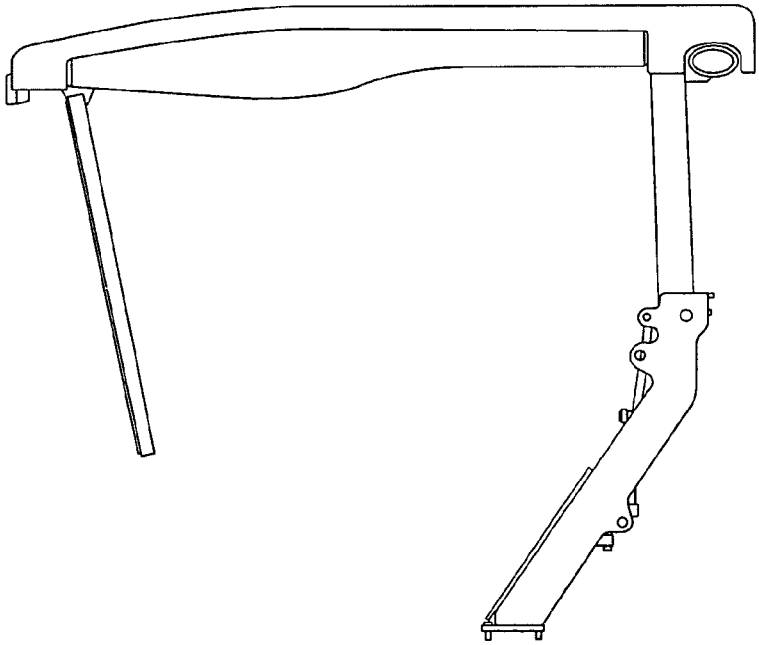
Figure 12:
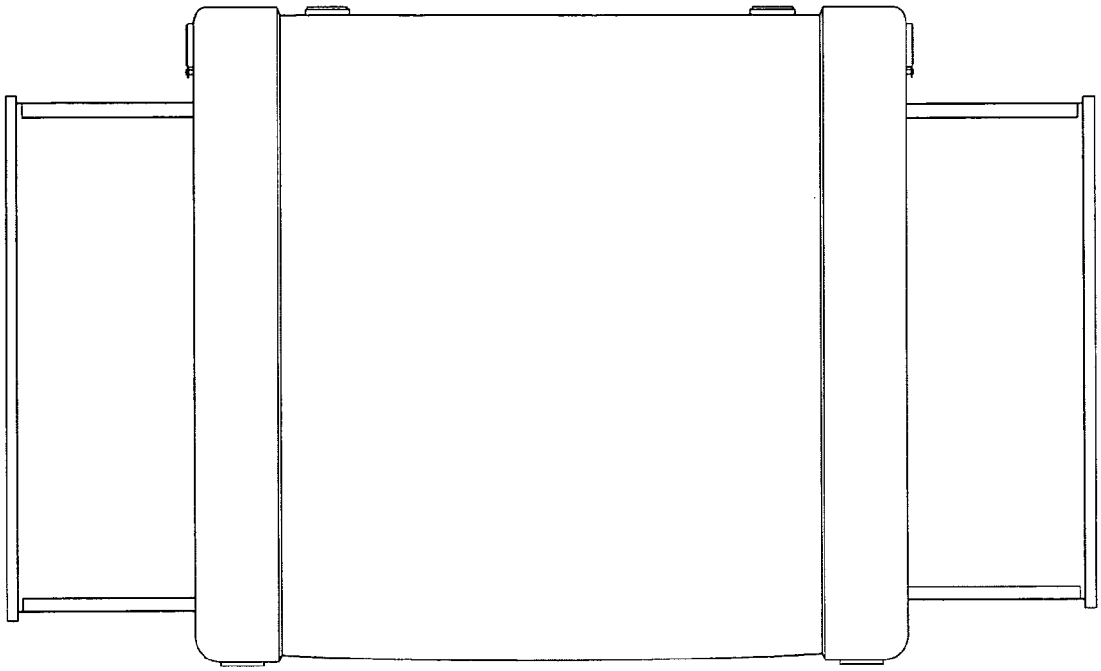
Figure 13:
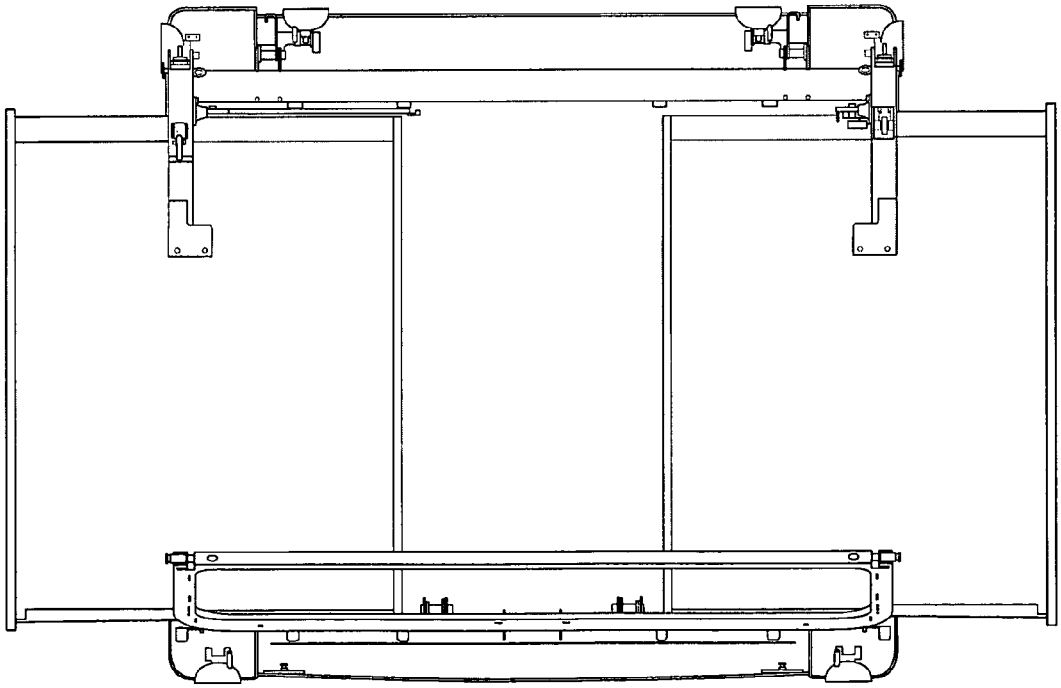
Figure 14:
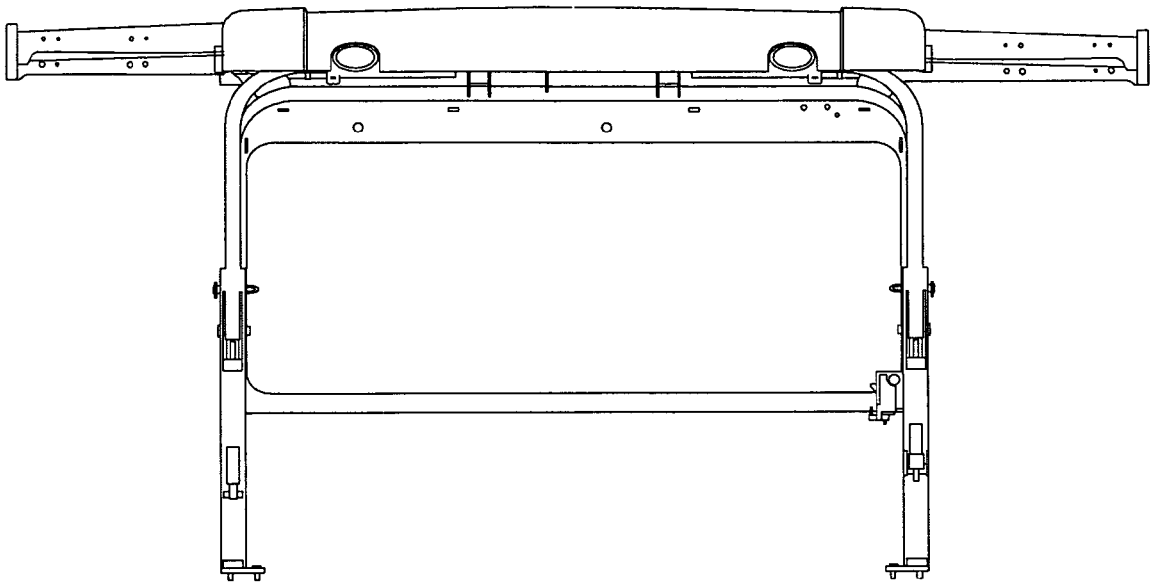

Matter enclosed in heavy brackets [ ] appears in the original patent but forms no part of this reissue; matter printed in italics indicates the additions made by reissue.

U.S. PATENT DOCUMENTS 4,721,031 A * 1/1988 Nakata et al. ..... 454/121
D306,450 S * 3/1990 Funabashi et al. ..... D15/30
D317,011 S * 5/1991 Boddin et al. ..... D15/30
D329,435 S * 9/1992 Katoh et al. ..... D15/23
D348,553 S * 7/1994 Martin, Jr. ..... D34/37
5,695,238 A * 12/1997 Calamari et al. ..... 296/210
6,189,955 B1 * 2/2001 Fryk et al. ..... 296/190.08
6,688,682 B2 * 2/2004 Arthur et al. ..... 296/216.02
D507,281 S * 7/2005 Komatsu et al. ..... D15/30
D507,800 S * 7/2005 Kuwae et al. ..... D15/30

* cited by examiner